United States Patent
Shimomichi et al.

(10) Patent No.: US 11,407,639 B2
(45) Date of Patent: Aug. 9, 2022

(54) ALUMINUM PHOSPHITE AND COMPOSITION CONTAINING ALUMINUM PHOSPHITE

(71) Applicant: Taihei Chemical Industrial Co., Ltd., Osaka (JP)

(72) Inventors: Hiroyuki Shimomichi, Aichi (JP); Tomofumi Yamanaka, Aichi (JP); Ryo Oyama, Aichi (JP); Toshihiro Yamagami, Tokyo (JP)

(73) Assignee: TAIHEI CHEMICAL INDUSTRIAL CO., LTD., Osaka (JP)

( * ) Notice: Subject to any disclaimer, the term of this patent is extended or adjusted under 35 U.S.C. 154(b) by 269 days.

(21) Appl. No.: 16/753,859

(22) PCT Filed: Aug. 10, 2018

(86) PCT No.: PCT/JP2018/030032
§ 371 (c)(1),
(2) Date: Apr. 6, 2020

(87) PCT Pub. No.: WO2019/073683
PCT Pub. Date: Apr. 18, 2019

(65) Prior Publication Data
US 2020/0277191 A1 Sep. 3, 2020

(30) Foreign Application Priority Data
Oct. 11, 2017 (JP) .............................. JP2017-197533

(51) Int. Cl.
*C01B 25/163* (2006.01)
*C08L 101/00* (2006.01)

(52) U.S. Cl.
CPC .......... *C01B 25/163* (2013.01); *C08L 101/00* (2013.01); *C01P 2004/32* (2013.01); *C08L 2201/02* (2013.01)

(58) Field of Classification Search
CPC .. C01B 25/163; C08L 101/00; C08L 2201/02; C01P 2004/32; C08K 3/016; C08K 3/32; C09D 7/61; C09D 5/185; C09K 21/04
See application file for complete search history.

(56) References Cited

U.S. PATENT DOCUMENTS

| | | | | |
|---|---|---|---|---|
| 5,256,718 A * | 10/1993 | Yamamoto | ............... | C08L 77/00 524/412 |
| 5,298,545 A * | 3/1994 | Razvan | ................... | C08K 3/32 423/306 |
| 5,356,982 A * | 10/1994 | Razvan | ................. | C01B 25/163 423/306 |
| 5,965,639 A * | 10/1999 | Yamauchi | ............... | C08L 55/02 524/80 |
| 9,481,831 B2 | 11/2016 | Bauer et al. | | |
| 9,505,904 B2 | 11/2016 | Bauer et al. | | |
| 2014/0371361 A1* | 12/2014 | Bauer | .................... | C09K 21/04 524/133 |

FOREIGN PATENT DOCUMENTS

| | | | |
|---|---|---|---|
| JP | 04089306 A | * | 3/1992 |
| JP | 8-198609 | | 8/1996 |
| JP | 2899916 | | 6/1999 |
| JP | 2016148059 A | * | 8/2016 |

OTHER PUBLICATIONS

Haskouri et al., "Mesoporous aluminum phosphite," Journal of Solid State Chemistry 182 (2009) 2122-2129. (Year: 2009).*
Machine Translation of JPH08198609A. Printed Feb. 25, 2022. (Year: 2022).*
Notice of Reasons for Refusal dated Feb. 9, 2021 in corresponding Japanese Patent Application No. 2019-547931, with English Translation.
Office Action dated Nov. 17, 2021 in corresponding Taiwanese Patent Application No. 107135156, with English-language translation.
Extended European Search Report dated May 21, 2021 in corresponding European Patent Application No. 18865836.3.
International Search Report dated Sep. 4, 2018 in International Application No. PCT/JP2018/030032.

* cited by examiner

*Primary Examiner* — Anthony J Zimmer
(74) *Attorney, Agent, or Firm* — Wenderoth, Lind & Ponack, L.L.P.

(57) ABSTRACT

An object of the present invention is to provide an aluminum phospite having spherical shape. An aluminum phosphite of the present invention has the following formula.

$$Al_x(OH)_y(HPO_3)_3 \cdot zH_2O$$

wherein: x represents 2.01 or more and 2.50 or less, y represents 0.03 or more and 1.50 or less, and z represents an integer of 0 to 4, respectively.

2 Claims, 1 Drawing Sheet

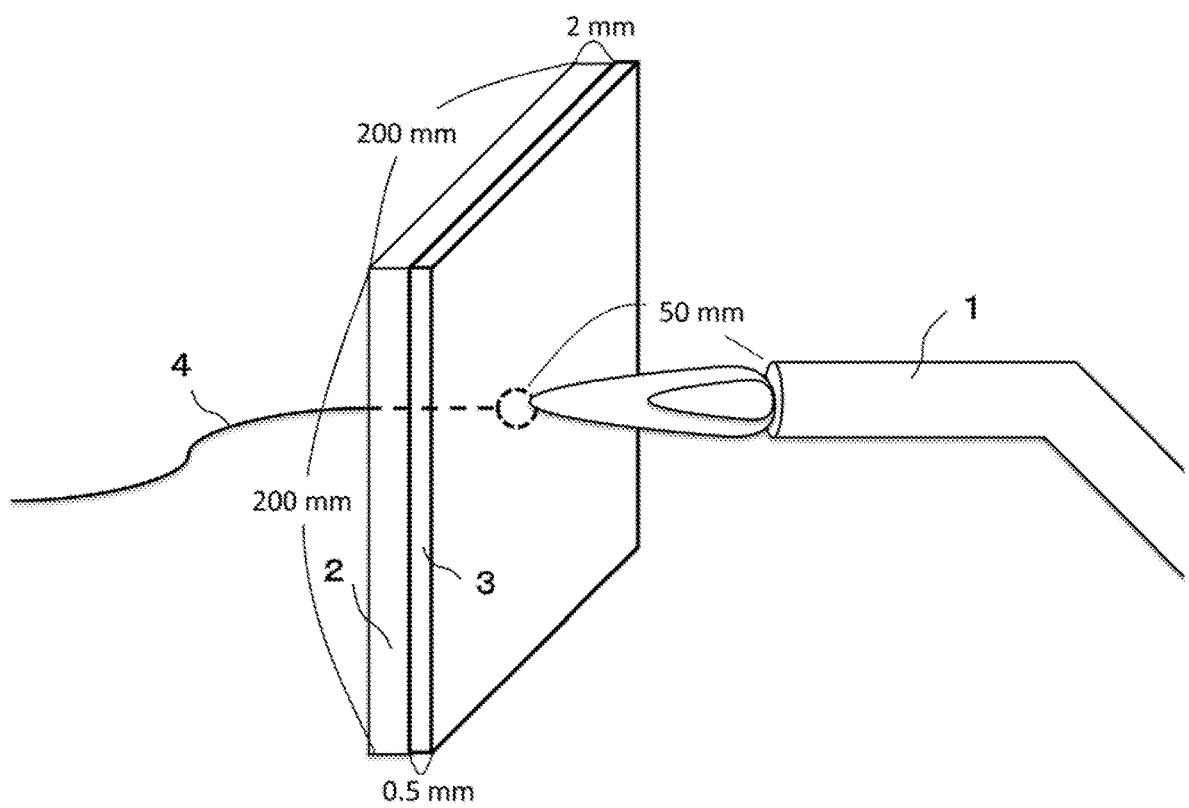

ALUMINUM PHOSPHITE AND COMPOSITION CONTAINING ALUMINUM PHOSPHITE

TECHNICAL FIELD

The present invention relates to an aluminum phosphite and a composition containing the aluminum phosphite.

BACKGROUND ART

As a flame retardant (flame protecting agent) with excellent fluidity and fireproof performance and the like, the present applicant discloses a spherical aluminum phosphite crystal and a method for producing the same in Patent Document 1. The aforementioned aluminum phosphite is produced as follows. Alumina hydrate is added to an aqueous solution of phosphorous acid heated to 50° C. or more so as to effect the reaction to obtain a viscous aluminum phosphite slurry. Then, fine crystals are gradually precipitated with stirring the slurry at 50 to 90° C. and the fine crystals are made to grow into spherical bodies. Thereafter, the spherical bodies are centrifugally dehydrated, and the obtained dehydrated spherical bodies are dried at 200° C. for 16 hours. Thus produced aluminum phosphite has an expanding property. The aforementioned aluminum phosphite is useful as a flame retardance-improving agent for a thermoplastic resin such as a polyester resin and a polyamide resin, and has been commercialized as APA-100.

PRIOR ART DOCUMENT

Patent Documents

Patent Document 1: JP2899916B1

SUMMARY OF THE INVENTION

Problems to be Solved by the Invention

Aluminum phosphite improves flame retarding properties by forming a heat insulating layer having bubbles called a surface expanding layer (Intumescent) on its surface during combustion. The higher the expansion ratio, the better the heat resistance to materials, for example, a stainless steel plate and the like. In recent years, the demand for heat resistance has been increasing more and more, and it has been desired to provide an aluminum phosphite having a higher expansion ratio.

The present invention has been made in view of the circumstances, and an object thereof is to provide an aluminum phosphite having a high expansion ratio and a composition containing the aluminum phosphite.

Solution to the Problems

The present invention is described below:
[1] An aluminum phosphite represented by the following formula.

wherein:
x represents 2.01 or more and 2.50 or less,
y represents 0.03 or more and 1.50 or less, and
z represents an integer of 0 to 4, respectively.
[2] A composition comprising:
an organic matrix; and
the aluminum phosphite of above [1].

Advantageous Effects of the Invention

According to the present invention, an aluminum phosphite having a higher expansion ratio than a conventional aluminum phosphite can be provided. A composition containing the aluminum phosphite of the present invention is extremely excellent in heat resistance to materials, for example, a stainless steel plate and the like, and therefore is useful as a flame-retardant coating agent or the like.

BRIEF DESCRIPTION OF THE DRAWINGS

FIG. 1 is a schematic diagram of a heat resistance test apparatus used in Experimental Example 2.

DESCRIPTION OF EMBODIMENTS

The present inventors have studied to solve the aforementioned problems. As a result, it has been found that in the production method of Patent Document 1 described above, when the Al supply source and the P supply source are appropriately blended such that Al:P=2.01 to 2.50:3 instead that the blending ratio (molar ratio) of Al and P constituting an aluminum phosphite is the stoichiometric ratio (Al:P=2.00:3) as in the aforementioned Patent Document 1, an expansion ratio is improved (about 5 times as measured by the method described in the column of Examples described later) as compared with the expansion ratio of the aforementioned Patent Document 1, and the present invention has been completed.

On the other hand, it has been found that when raw materials having a molar ratio of Al and P outside the aforementioned range were used, no further improvement in the expansion ratio was observed (see the column of Examples described later).

(Aluminum phosphite of the present invention)

The aluminum phosphite of the present invention, also known as aluminum hydroxide phosphonate, is a spherical aluminum phosphite having an expanding property. The aluminum phosphite is represented by the following formula. On the other hand, when Al and P are blended in the stoichiometric ratio as in Patent Document 1, x=2.00 and y=0 in the following formula, and the obtained aluminum phosphite is different from that of the present invention in that it is represented by $Al_2(HPO_3)_3$.

wherein:
x represents 2.01 or more and 2.50 or less,
y represents 0.03 or more and 1.50 or less, and
z represents an integer of 0 to 4, respectively.

Here, in order to obtain a higher expansion ratio, x is preferably 2.03 or more, is more preferably 2.05 or more, and is still more preferably 2.07 or more. In addition, x is preferably 2.40 or less, and is more preferably 2.25 or less.

Further, in order to obtain a much higher expansion ratio, y is preferably 0.05 or more, is more preferably 0.15 or more, and is still more preferably 0.25 or more. In addition, y is preferably 1.20 or less, and is more preferably 0.80 or less.

The aluminum phosphite of the present invention may be a hydrate, and z is an integer of 0 to 4.

The aluminum phosphite of the present invention is spherical. Here, the term "spherical" means having a spherical shape or a shape close to a spherical shape, and having a diameter distributed in a range of about 0.1 to 500 µm (preferably 0.5 to 350 µm, more preferably 1 to 300 µm, and still more preferably 2 to 125 µm) and a mean diameter of about 4 to 50 µm (preferably 15 to 35 µm).

For the shape of the aluminum phosphite, for example, FIGS. 1 to 3 of Patent Document 1 described above can be referred to. The spherical shape is confirmed by observation with a scanning electron microscope (SEM) as described in the column of Examples described later.

A feature of the aluminum phosphite of the present invention is having a high expanding property. Here, the phrase "expanding property" means that which expands when being heated to about 300° C. to 1350° C. The aluminum phosphite of the present invention expands stably up to about 1200° C. In the present invention, the expansion ratio is measured by the method described in Examples described later. In the Examples, the expansion ratio is measured based on the volume change before and after heating the aluminum phosphite at 500° C. for 1 hour. According to this method, the expansion ratio can be calculated with higher accuracy compared with a method of measuring an approximate expansion ratio based on the appearance or the like. When the expansion ratio of the aluminum phosphite described in Patent Document 1 described above was measured based on the method described in the Examples, it was at most about 5 times, whereas the expansion ratio of the aluminum phosphite according to the present invention was higher than about 5 times. The aluminum phosphite according to the present invention is very useful in that an expansion ratio of about 30 to 40 times can be obtained by controlling the composition ratio in a more preferable range.

In order to produce the aluminum phosphite of the present invention, the blending ratio (molar ratio) of Al and P constituting the aluminum phosphite is required to be controlled so that Al:P=2.01 to 2.50:3, that is, the blending ratio is required to be controlled to be Al rich with respect to the stoichiometric ratio (Al:P=2.00:3). Except for this point, the aluminum phosphite of the present invention may be produced by the same method as in Patent Document 1. Examples of the Al supply source include aluminum hydroxide, alumina hydrate, boehmite and the like. In addition, examples of the P supply source include phosphorous acid, aluminum dihydrogen phosphite and the like.

Here, in order to obtain a desired spherical aluminum phosphite, it is important to add aluminum hydroxide to an aqueous solution of phosphorous acid heated to a predetermined temperature as in Patent Document 1 described above. Conversely, that is, when an aqueous solution of phosphorous acid is added to aluminum hydroxide heated to a predetermined temperature, a spherical aluminum phosphite having a high expansion ratio cannot be obtained.

In addition, when aluminum hydroxide is further added to an aluminum phosphite satisfying the stoichiometric composition, only a mixture instead of a single compound is obtained, and it is confirmed that the obtained mixture has an expansion ratio almost the same as that of Conventional Example. That is, in order to produce a desired aluminum phosphite, it is required to appropriately control Al and P at the stage of raw materials.

For example, as an example of the production method, the following method can be mentioned. That is, alumina hydrate is provided as the Al supply source, and an aqueous solution of phosphorous acid is provided as the P supply source. After being charged into a stirrer and mixed so that the molar ratio of Al:P becomes Al:P=2.01 to 2.50:3, making the mixture proceed from a slurry state to a viscous liquid (reaction product) while stirring at 50 to 90° C. Then fine crystals are made to precipitate gradually and are made to grow into spherical bodies. Thereafter, the aluminum phosphite dehydrated by centrifugation is dried at 120 to 200° C. for 1 to 48 hours.

(Composition of the Present Invention)

The composition of the present invention contains an organic matrix and the aforementioned aluminum phosphite. The composition is particularly excellent in heat resistance.

(Aluminum Phosphite)

The details of the aluminum phosphite are as described above. In order to effectively exert the aforementioned action by adding the aluminum phosphite, the content ratio of the aluminum phosphite to 100 parts by mass of the composition is preferably 5 to 70 parts by mass. When the content ratio is less than the aforementioned ratio, the effect of adding the aluminum phosphite is not effectively exerted, and heat resistance decreases. On the other hand, when the content ratio exceeds the aforementioned ratio, the kneading operation becomes difficult. The content ratio is more preferably 20 to 60 parts by mass.

(Organic Matrix)

The organic matrix is not particularly limited as long as it improves heat resistance when being mixed with the aluminum phosphite, and examples thereof include a coating component, a resin such as a polyamide resin, rubber, a fabric and the like. In addition, an expanded body such as expanded graphite may also be used as the organic matrix. The organic matrix may be added alone or a combination of two or more organic matrixes may be used.

Examples of the coating component include a synthetic resin such as an acrylic resin, a silicon resin, an acrylic silicon resin, a melamine resin, a fluororesin, a polyester resin, an epoxy resin, and a urethane; and a natural resin derived from a plant, an animal, and a mineral. A commercially available product may be used as the coating, and for example, an aqueous multi-purpose color (manufactured by Asahipen Corporation) or the like is used. As described above, as the aluminum phosphite of the present invention has a high expansion ratio, when a composition (expandable coating composition) in which the aforementioned aluminum phosphite is blended with a coating component is applied to a material such as a stainless steel plate, the fireproof effect is significantly improved. In addition, since the composition is a hardened foam, the composition is capable of maintaining an excellent fireproof effect stably, for example, without being blown off by a fire or the like as in the case of a composition in which an ammonium polyphosphate is blended with a coating component.

The preferable coating thickness of the expandable coating composition is not particularly limited and may be appropriately changed depending on the material to be used, the application site and the like, and is, for example, about 0.1 to 5 mm. As shown in Experimental Example 2 described later, according to the present invention, even when the coating thickness is extremely thin as thin as 0.5 mm, the composition is extremely useful in that it can exhibit excellent fireproof performance on a stainless steel plate.

As the resin, a thermoplastic resin such as a polyamide resin, a polyester resin, a polycarbonate resin, an acrylic resin, an olefin resin, a styrene resin, a polyolefin oxide resin, and a vinyl resin is preferably used, and a polyamide resin or a polyester resin is more preferably used in the present invention. As described above, a feature of the present invention is use of the aforementioned aluminum phosphite, and the type of the thermoplastic resin used is not particularly limited. For example, a polyamide or a polyester described in JP-A-2013-538926 can be used.

A commercially available product may be used as the resin, and for example, NOVADURAN 5010R5 (manufactured by Mitsubishi Engineering-Plastics Corporation), Amilan CM3001N (manufactured by Toray Industries, Inc.) and the like are used.

In the present invention, the content ratio of the resin to 100 parts by mass of the composition containing the resin is preferably 30 to 95 parts by mass. When the content ratio is lower than the aforementioned ratio, the kneading torque increases, and the working property significantly decreases. On the other hand, when the content ratio exceeds the aforementioned ratio, the desired heat resistance cannot be obtained. The content ratio is more preferably 40 to 80 parts by mass.

The composition of the present invention may further contain the following additives.

For example, the composition may further contain an inorganic filler for the purpose of reinforcing the strength, rigidity and the like of the resin. As described above, a feature of the present invention resides in that the aforementioned aluminum phosphite is used, and the type of the inorganic filler is not particularly limited. For example, a usually used inorganic filler such as glass fiber, carbon fiber, silicon carbide fiber, alumina fiber, potassium titanate whisker, aluminum borate whisker, aramid fiber, mica, talc, kaolin, and wollastonite may be used. The inorganic filler may be used alone or a mixture of two or more inorganic fillers may be used. Among them, glass fiber, carbon fiber, mica, talc, kaolin, wollastonite, and a mixture thereof are preferably used.

A commercially available product may be used as the inorganic filler, and for example, ECS03-631K (manufactured by Central Glass Co., Ltd.) or the like is used.

In the present invention, the content ratio of the inorganic filler to 100 parts by mass of the composition containing the resin is preferably 5 to 60 parts by mass. When the content ratio is less than the aforementioned ratio, the effect of adding the inorganic filler is not effectively exhibited, and it becomes difficult to reinforce the strength and the like of the resin. On the other hand, when the content ratio exceeds the aforementioned ratio, the kneading operation becomes difficult. The content ratio is more preferably 10 to 45 parts by mass.

Alternatively, the composition may further contain a phosphinic acid salt for the purpose of improving the flame retarding properties of the composition containing the resin. The type of the phosphinic acid for the phosphinic acid salt is not particularly limited, but examples thereof include dimetylphosphinic acid, ethylmethylphosphinic acid, diethylphosphinic acid, methyl-n-propylphosphinic acid, isobutylmethylphosphinic acid, octylmethylphosphinic acid, methylphenylphosphinic acid, diphenylphosphinic acid and the like. Among them, diethylphosphinic acid is preferably used in consideration of price and handling.

The phosphinic acid salt is a salt of the phosphinic acid described above, and examples thereof include a calcium salt, an aluminum salt, a magnesium salt, a zinc salt and the like.

Among the phosphinic acid salts used in the present invention, in consideration of the balance between flame retarding properties and electrical properties and the like, aluminum diethylphosphinate and zinc diethylphosphinate are preferable, and aluminum diethylphosphinate is more preferable.

A commercially available product may be used as the phosphinic acid salt, and for example, Exolit OP-1230 (manufactured by Clariant AG) or the like is used.

In the present invention, the content ratio of the phosphinic acid salt to 100 parts by mass of the composition containing the resin is preferably 15 to 50 parts by mass. When the content ratio is less than the aforementioned ratio, the effect of improving flame retarding properties due to the addition of the phosphinic acid salt is not effectively exhibited. On the other hand, when the content ratio exceeds the aforementioned ratio, the kneading torque increases, and the working property significantly decreases. The content ratio is more preferably 20 to 30 parts by mass.

The composition of the present invention is applicable to various fields such as, for example, coatings, adhesives, electric and electronic components, automobiles, and building interiors.

The present application claims the benefit of priority based on Japanese Patent Application No. 2017-197533 filed on Oct. 11, 2017. The entire contents of the specification of Japanese Patent Application No. 2017-197533 filed on Oct. 11, 2017 are incorporated herein by reference.

EXAMPLES

Hereinafter, the present invention will be described in more detail with reference to examples, but the present invention is in no way limited to the following examples, and of course, changes can be appropriately made as long as the above-described and later-described purposes are met. All of these changes are encompassed in the technical scope of the present invention.

Experimental Example 1

In this Experimental Example, the crystal form and the expansion ratio were compared and examined when an aluminum phosphite was produced by changing the blending ratio (molar ratio) of Al and P variously as shown in Table 1.

Conventional Example

Conventional Example is an example corresponding to Patent Document 1 described above.

First, 1,400 g of phosphorous acid was added to 1,400 g of water to prepare a 50% aqueous solution, and then the solution was heated to 80° C. While stirring at this temperature, 887.9 g of aluminum hydroxide was gradually added and the reaction was caused to form a viscous solution. Thereafter, stirring was continued for 3 hours to complete crystallization while maintaining the temperature at 80° C. After that, the reaction slurry was filtered and dried at 200° C. for 16 hours to obtain an aluminum phosphite of Conventional Example.

Example 1

An aluminum phosphite of Example 1 was obtained in the same manner as in Conventional Example except that the amount of aluminum hydroxide added was changed to 892.3 g.

Example 2

An aluminum phosphite of Example 2 was obtained in the same manner as in Conventional Example except that the amount of aluminum hydroxide added was changed to 905.7 g.

Example 3

An aluminum phosphite of Example 3 was obtained in the same manner as in Conventional Example except that the amount of aluminum hydroxide added was changed to 923.4 g.

Example 4

An aluminum phosphite of Example 4 was obtained in the same manner as in Conventional Example except that the amount of aluminum hydroxide added was changed to 932.3 g.

Example 5

An aluminum phosphite of Example 5 was obtained in the same manner as in Conventional Example except that the amount of aluminum hydroxide added was changed to 976.7 g.

Example 6

An aluminum phosphite of Example 6 was obtained in the same manner as in Conventional Example except that the amount of aluminum hydroxide added was changed to 1021.1 g.

Example 7

An aluminum phosphite of Example 7 was obtained in the same manner as in Conventional Example except that the amount of aluminum hydroxide added was changed to 1109.9 g.

Comparative Example 1

An aluminum phosphite of Comparative Example 1 was obtained in the same manner as in Conventional Example except that the amount of aluminum hydroxide added was changed to 1243.1 g.

Comparative Example 2

An aluminum phosphite of Comparative Example 2 was obtained in the same manner as in Conventional Example except that the amount of aluminum hydroxide added was changed to 1331.9 g.

The following items were measured for each compound obtained as described above.

(Composition Ratio of Al and P)

0.1 g of each compound was weighed, 20 mL of aqua regia was added thereto, and the compound was dissolved by heating to about 100° C. (boiling). The Al content and the P content of the solution thus obtained were measured using an ICP emission spectrophotometer (SPS3520V manufactured by SII NanoTechnology Inc.).

(Crystal Form)

The crystal form of each compound was observed using a scanning electron microscope (TM-1000 Miniscope, manufactured by Hitachi High-Technologies Corporation).

(Expansion Ratio)

In a 20 mL screw tube (No. 5 manufactured by Maruemu Corporation), 0.2 g of each compound was placed, and heated at 500° C. for 1 hour using a benchtop muffle furnace (KDF S80 manufactured by DENKEN-HIGHDENTAL Co., Ltd.). The amount of change in volume before and after heating was measured to calculate the expansion ratio of each compound.

These results are shown together in Table 1. In each compound shown in Table 1, z is zero.

TABLE 1

| Aluminum phosphite | Blending ratio (molar ratio) | | Composition ratio | | Crystal form | Expansion ratio |
| --- | --- | --- | --- | --- | --- | --- |
| | Al | P | x | y | | |
| Conventional Example | 2.00 | 3 | 2.00 | 0 | Spherical | 5 times |
| Example 1 | 2.01 | 3 | 2.01 | 0.03 | Spherical | 7 times |
| Example 2 | 2.04 | 3 | 2.04 | 0.12 | Spherical | 18 times |
| Example 3 | 2.08 | 3 | 2.08 | 0.24 | Spherical | 32 times |
| Example 4 | 2.10 | 3 | 2.10 | 0.30 | Spherical | 30 times |
| Example 5 | 2.20 | 3 | 2.20 | 0.60 | Spherical | 30 times |
| Example 6 | 2.30 | 3 | 2.30 | 0.90 | Spherical | 22 times |
| Example 7 | 2.50 | 3 | 2.50 | 1.50 | Spherical | 12 times |
| Comparative Example 1 | 2.80 | 3 | 2.80 | 2.40 | Spherical | 2 times |
| Comparative Example 2 | 3.00 | 3 | 3.00 | 3.00 | Spherical | Equal |

In Table 1, the aluminum phosphite of each of Examples 1 to 7 satisfies the composition ratio defined in the present invention, is spherical, and has a higher expansion ratio than that of Conventional Example (expansion ratio of 5 times). Particularly, in each of Examples 2 to 7, an expansion ratio of 10 times or more was obtained, and in each of Examples 3 to 5, an expansion ratio of 30 times or more was obtained.

In contrast, Comparative Examples 1 and 2 are examples that do not satisfy the composition ratio defined in the present invention. In Comparative Example 1, the expansion ratio was as low as 2 times that of Conventional Example, and in Comparative Example 2, the compound did not expand at all.

From these results, it was confirmed that an aluminum phosphite having a high expansion ratio can be obtained by appropriately controlling the blending ratio (molar ratio) of Al and P.

Experimental Example 2

In this Experimental Example, the heat resistance on a stainless steel plate was compared and examined using a heat resistance test apparatus shown in FIG. 1 provided with a test piece for evaluating heat resistance.

(1) Preparation of Test Piece for Evaluating Heat Resistance

First, each of the aforementioned aluminum phosphites and an aqueous coating [an aqueous multi-purpose color (clear) manufactured by Asahipen Corporation] were blended in a ratio of 40:60 (parts by mass), and the mixture was mixed and dispersed (2160 rpm) for 2 minutes using a batch-type desktop sand mill (batch-type desktop sand mill dispersion software manufactured by Kanpe Hapio Co., Ltd.).

Each coating composition obtained in this way was applied on a SUS304 plate (200 mm long×200 mm wide×2 mm thick) manufactured by Daido Steel Co., Ltd. using a 2.5 mm thick mold such that the coating thickness was 0.5 mm. After drying at room temperature for 12 hours, a test piece for evaluating heat resistance was obtained (each of test pieces Nos. 2 to 11 in Table 2).

(2) Heat Resistance Evaluation Method

In this Example, heat resistance (fireproof performance) was evaluated as described below with reference to "Method of fire resistance test for structural parts of buildings" described in JIS A 1304 (1994).

As shown in FIG. 1, the tip of a gas burner 1 (RINCE GT-9000 manufactured by Style) equipped with a gas cylinder (GT-G manufactured by Prince) was attached to each test piece (a SUS304 plate 2 coated with a coating film 3) such that the tip was 50 mm away from the center of the coating film surface. A contact type thermocouple 4 (E5CB manufactured by OMRON Industrial Automation) was also attached to the center of the back surface side (the side where the coating film 3 was not formed) of each test piece. After heating for 10 minutes, the temperature (maximum temperature) was measured when the back surface SUS plate reached the maximum temperature. The temperature of the gas burner was 2,100° C.

For comparison, a test piece on which no coating composition was applied to the SUS304 plate was also prepared, and the maximum temperature was measured in the same manner (test piece No. 1 in Table 2).

These results are shown in Table 2.

TABLE 2

| Test piece No. | Aluminum phosphite | Maximum temperature (° C.) |
|---|---|---|
| 1 | No | Unmeasurable |
| 2 | Conventional Example in Table 1 | 750 |
| 3 | Example 1 in Table 1 | 680 |
| 4 | Example 2 in Table 1 | 420 |
| 5 | Example 3 in Table 1 | 335 |
| 6 | Example 4 in Table 1 | 355 |
| 7 | Example 5 in Table 1 | 345 |
| 8 | Example 6 in Table 1 | 390 |
| 9 | Example 7 in Table 1 | 580 |
| 10 | Comparative Example 1 in Table 1 | 835 |
| 11 | Comparative Example 2 in Table 1 | 930 |

The test piece No. 1 in Table 2 is an example in which the heat resistance test was performed without applying any of the coating compositions to the SUS304 plate, and the maximum temperature exceeded 1000° C. and measurement was impossible.

On the other hand, each of test pieces Nos. 3 to 9 is an example using the coating composition containing the aluminum phosphite of each of Examples 1 to 7 in Table 1 satisfying the composition ratio defined in the present invention. With regard to each of these test pieces, the maximum temperature was significantly lowered as compared with the test piece No. 2 using the coating composition containing the aluminum phosphite of Conventional Example in Table 1. These experimental results indicate that the use of the aluminum phosphite of the present invention significantly improves the heat resistance on the stainless steel plate.

In particular, the maximum temperature of each of the test pieces Nos. 5 to 8 using the aluminum phosphite of each of Examples 3 to 6 in Table 1 showing a very high expansion ratio of 22 to 32 times was 335 to 390° C. In each of Examples 3 to 6, it was possible to lower the maximum temperature to about half of that of the test piece No. 2 (maximum temperature of 750° C.).

On the other hand, both of the test pieces Nos. 10 and 11 are examples using coating compositions containing aluminum phosphites of Comparative Examples 1 and 2 in Table 1, which are outside the composition ratio of the present invention. In each of these test pieces, the maximum temperature increased than that in the test piece No. 2.

From these results, it was demonstrated that the use of a coating composition property-improving component in which the blending ratio (molar ratio) of Al and P was appropriately controlled significantly improved the heat resistance to a material such as a stainless steel plate.

DESCRIPTION OF REFERENCE SIGNS

1. Gas burner
2. SUS304 plate
3. Coating film
4. Contact type thermocouple

The invention claimed is:

1. An aluminum phosphite represented by the following formula:

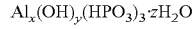

$Al_x(OH)_y(HPO_3)_3 \cdot zH_2O$ wherein:
x represents 2.01 or more and 2.50 or less,
y represents 0.03 or more and 1.50 or less, and
z represents an integer of 0 to 4, respectively,
wherein the aluminum phosphite has a spherical shape.

2. A composition comprising:
an organic matrix; and
the aluminum phosphite of claim 1.

* * * * *